(12) United States Patent
Mitchell

(10) Patent No.: US 8,276,251 B2
(45) Date of Patent: Oct. 2, 2012

(54) HAND TOOL

(75) Inventor: David Mitchell, Queensland (AU)

(73) Assignee: Private Brand Tools (Australia) Pty Ltd, Queensland (AU)

( * ) Notice: Subject to any disclaimer, the term of this patent is extended or adjusted under 35 U.S.C. 154(b) by 559 days.

(21) Appl. No.: 12/505,743

(22) Filed: Jul. 20, 2009

(65) Prior Publication Data
US 2011/0010906 A1    Jan. 20, 2011

(51) Int. Cl.
*B23P 19/04* (2006.01)

(52) U.S. Cl. ............ 29/239; 29/266; 269/86; 269/96; 269/128

(58) Field of Classification Search ............ 269/3, 6, 269/86, 96, 128, 160, 203, 205, 216, 108, 269/166–170, 254 CS; 81/9.3, 485–487; 29/239, 266
See application file for complete search history.

(56) References Cited

U.S. PATENT DOCUMENTS

| | | | |
|---|---|---|---|
| 2,160,652 A * | 5/1939 | Feigh | 29/222 |
| 3,705,581 A * | 12/1972 | Drake | 606/53 |
| 5,732,936 A * | 3/1998 | Lii | 269/6 |
| 6,523,238 B1 * | 2/2003 | Priddy | 29/239 |
| 6,585,243 B1 * | 7/2003 | Li | 269/6 |
| 6,678,931 B1 * | 1/2004 | Tatasciore | 29/239 |
| 6,874,217 B2 | 4/2005 | Ploeger et al. | |
| 7,076,850 B2 | 7/2006 | Ploeger et al. | |
| 7,155,792 B1 * | 1/2007 | Miller, Jr. | 29/239 |
| 2004/0255445 A1 * | 12/2004 | Ploeger et al. | 29/239 |

* cited by examiner

*Primary Examiner* — George Nguyen
(74) *Attorney, Agent, or Firm* — Nixon & Vanderhye P.C.

(57) ABSTRACT

A hand tool comprises: a body; a handle extending from the body; a hand-operable lever pivotally connected to the body and pivotable from a resting position towards the handle to a working position; a shaft extending through the body along a longitundal axis, and movable between forward and reverse directions along the axis relative to the body; a shaft drive mechanism mounted to the body and operatively connected to the shaft and lever such that pivoting of the lever to the working position causes the shaft drive mechanism to incrementally advance the shaft only in the forward direction; and a shaft release mechanism mounted to the body and comprising a shaft locking member operatively connected to the shaft and lever, wherein the shaft locking member is movable by the lever between a locking position and an unlocking position, and wherein movement of the lever from the resting position away from the working position moves the shaft locking member to the unlocking position and enables the shaft to be moved in the reverse direction.

12 Claims, 11 Drawing Sheets

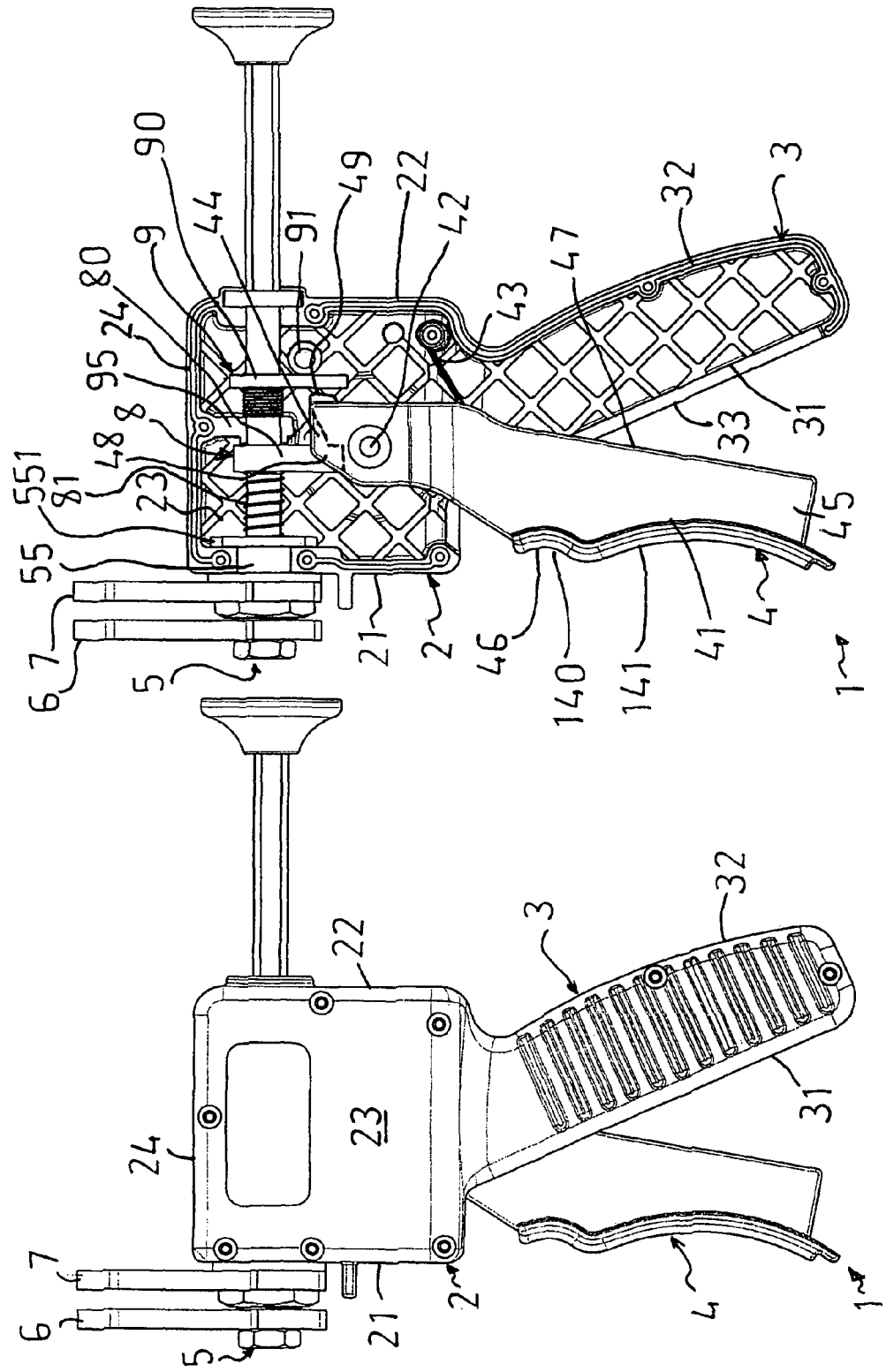

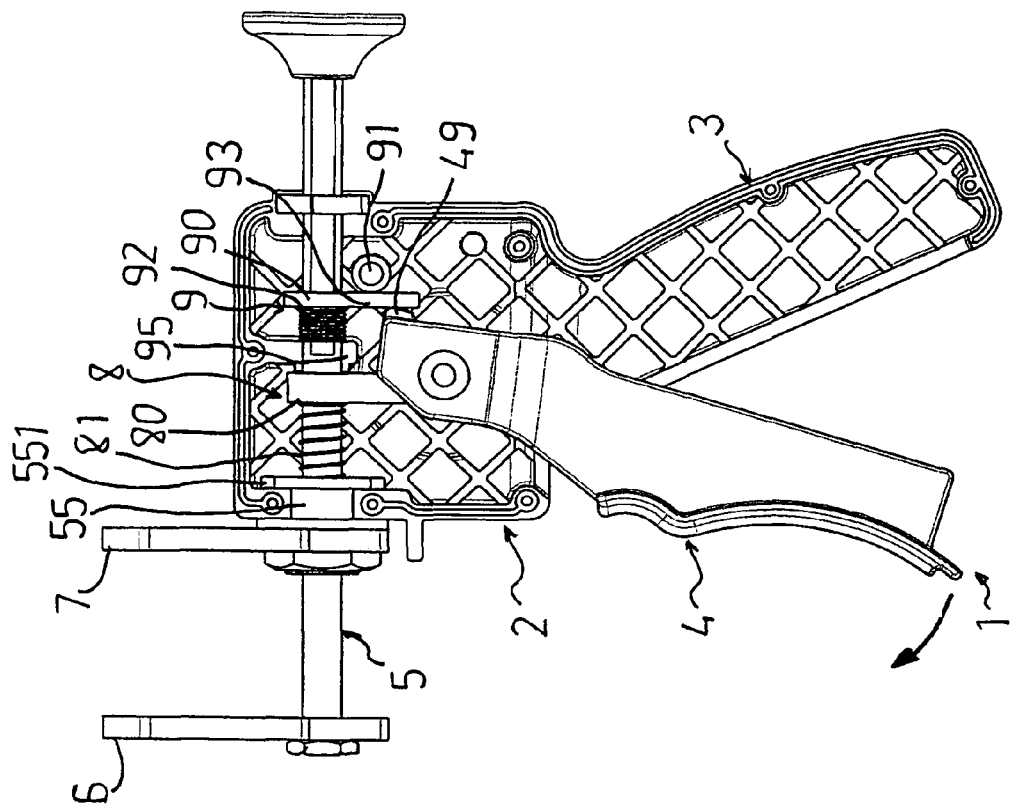
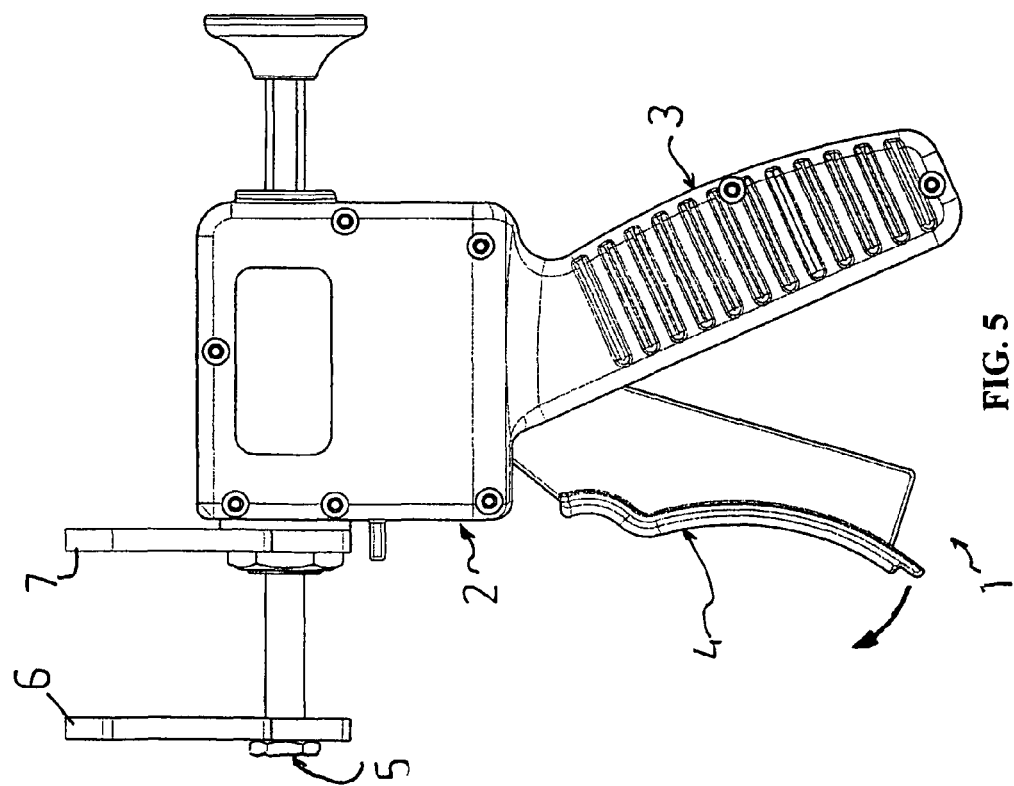
FIG. 5
FIG. 6

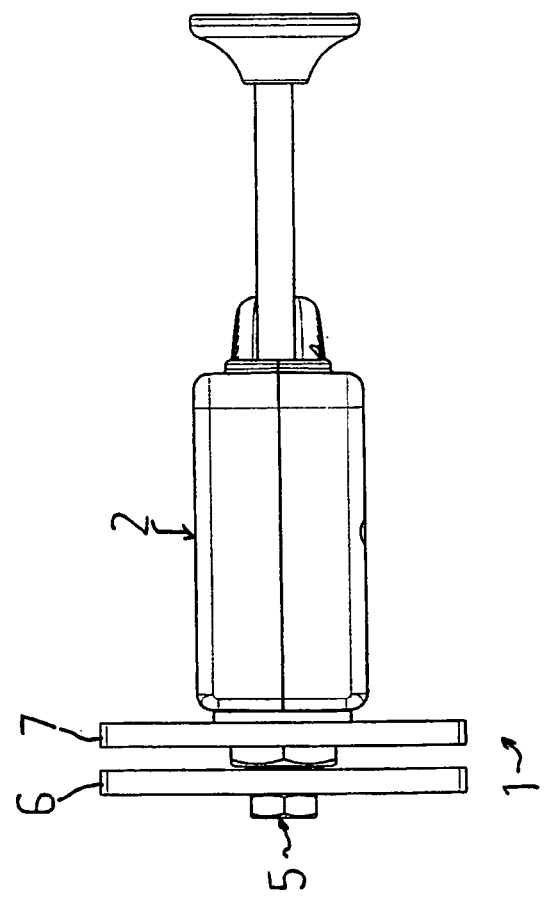
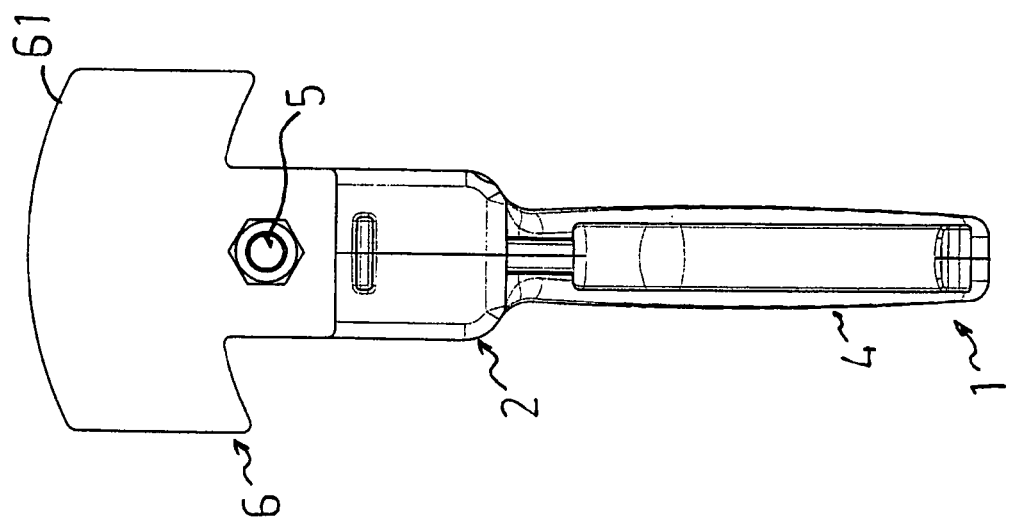
FIG. 7
FIG. 8

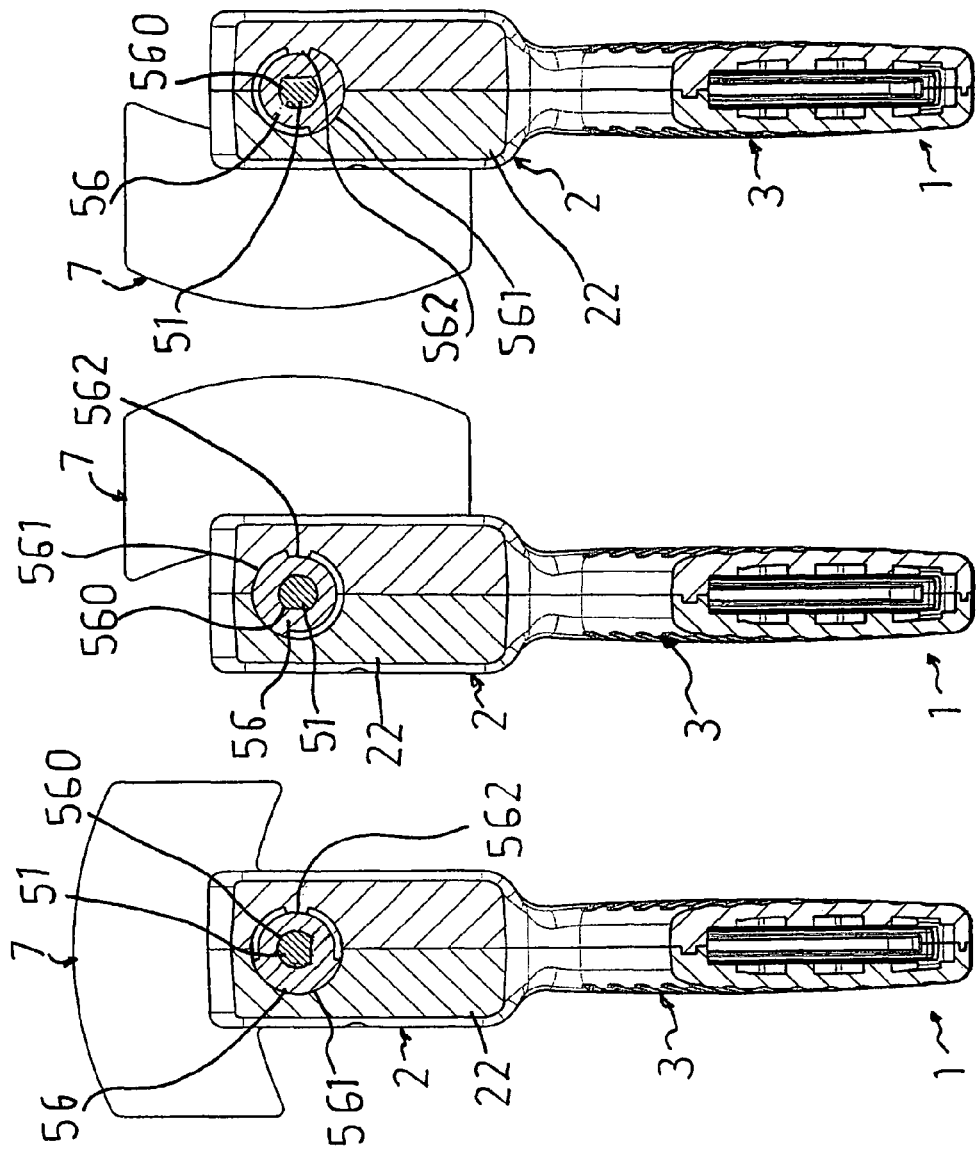
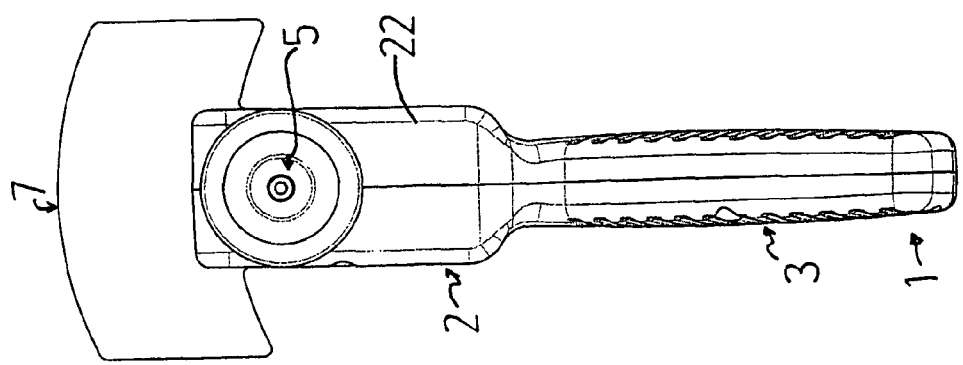

HAND TOOL

FIELD OF THE INVENTION

This invention relates to a hand tool of the type having a body, a hand-operable lever pivotably connected to the body, and a shaft extending through the body that is incrementally advanced in a forward direction relative to the body when actuating the lever. In a preferred embodiment, the invention concerns a hand tool having movable and fixed load applying members, for spreading vehicle brake pads of different types of disc-brake assemblies and for compressing caliper pistons of those assemblies.

BACKGROUND OF THE INVENTION

Over the life of a vehicle, worn brake pads of disc-brake assemblies will need to be replaced a number of times. This is usually accomplished by first spreading the worn brake pads, forcing each caliper piston into its piston housing, and then replacing the worn pads with new pads.

Hand tools for spreading vehicle brake pads and for compressing caliper pistons are know. One such tool is described in the specification of U.S. Pat. No. 6,874,217 and an improvement to that tool is described in the specification of U.S. Pat. No. 7,076,850. Each described tool has a body, a handle extending from the body, a hand-operable lever pivotally connected to the body, a shaft extending through the body and movable between forward and reverse directions relative to the body, a movable load applying member mounted to the shaft for applying a load when moved by the shaft into engagement with a brake pad, piston or caliper casting, a fixed load applying member fixed in position relative to the body for applying a load to a brake pad, piston or caliper casting, a shaft drive mechanism operatively connected to the shaft and lever for incrementally advancing the shaft in the forward direction, and a shaft release mechanism that when actuated allows the shaft to be moved in the reverse direction so as to allow disengagement of the load applying members from the brake assembly.

A disadvantage of each above mentioned tool is that it can only be used for the one caliper unit type that it was designed for. Yet another disadvantage is that, when the tool is under heavy load, a short release lever of the shaft release mechanism can be difficult to actuate so as to allow the shaft to be moved in the reverse direction.

SUMMARY OF INVENTION

It is an object of the present invention to provide a hand tool that overcomes one or more of the disadvantages referred to above. Another object is to provide the public with a useful or commercial choice.

The above and other objects of the invention will become readily apparent to those of skill in the relevant art from the following description.

In a first aspect the inventor has developed a hand tool comprising a hand-operable lever which in a first mode of use causes a shaft drive mechanism of the tool to incrementally advance a shaft of the tool only in a forward direction relative to a body of the tool, and which in a second mode of use enables the shaft to be released for manual retraction in a reverse direction relative to the body, even when the shaft is under heavy load. To the inventor's knowledge, no hand tool (brake pad spreader or caulking gun, for example) utilises a lever capable of working in both of the described modes.

According to a first aspect of the present invention, there is provided a hand tool comprising:
a body;
a handle extending from the body;
a hand-operable lever pivotally connected to the body and pivotable from a resting position towards the handle to a working position;
a shaft extending through the body along a longitudinal axis, and movable between forward and reverse directions along the axis relative to the body;
a shaft drive mechanism mounted to the body and operatively connected to the shaft and lever such that pivoting of the lever to the working position causes the shaft drive mechanism to incrementally advance the shaft only in the forward direction; and
a shaft release mechanism mounted to the body and operatively connected to the shaft and lever such that movement of the lever from the resting position away from the working position enables the shaft to be moved in the reverse direction.

The tool can comprise a movable load applying member mounted to the shaft for applying a load (directional force) to a first surface when moved by the shaft in the forward direction into engagement with the first surface. The movable load applying member can be of any suitable size, shape and construction, and can be made of any suitable material or materials. For example, the movable load applying member can be a metal plate, having an opening through which extends the shaft.

The tool can comprise a fixed load applying member held relative to the body and not movable by the shaft, for applying a load (directional force) to a second surface when brought into engagement with the second surface. The fixed load applying member can be of any suitable size, shape and construction, and can be made of any suitable material or materials. For example, the fixed load applying member can be a metal plate held by the body and having an opening through which extends the shaft.

In one embodiment, the tool can have movable and fixed surface compressing (ie. load-applying) members, for spreading brake pads of a vehicle disc-brake assembly and for compressing caliper pistons of that assembly.

In another embodiment, the tool can have a fixed load applying member in the form of a sleeve or housing for receiving and holding a cartridge, and a movable load applying member in the form of a plunger for compressing the cartridge and discharging the contents of the cartridge—much like a caulking gun.

The body of the tool can be of any suitable size, shape and construction, and can be made of any suitable material or materials, such as molded plastics material. The body can comprise a frame and or have external and internal walls that provide a housing for components such as part of the lever, part of the shaft, the shaft drive mechanism, and the shaft release mechanism. The housing can be in two or more detachable pieces so as to allow ready access to components located within.

The handle can be of any suitable size, shape and construction, and can be made of any suitable material or materials, such as molded plastics material. The handle and body can be of unitary construction. Preferably, the handle is in the form of a pistol grip handle extending from a lower region of the body and generally within the same plane as the body.

The handle can have a forward region and a rearward region. The forward region can have a longitudinally extending slot for receiving a rearward region of the lever when in the working position.

An external surface of the handle can have a grip so as to provide a user of the tool with additional traction. In one embodiment, the grip is in the form of ribbing molded within a surface of the handle.

The hand-operable lever can be of any suitable size, shape and construction, and can be made of any suitable material or materials. The lever can have an upper end and a lower end. The lever can have a forward region and a rearward region. The lever can be made of molded plastics material.

The forward region at the lower end of the lever can be shaped for easy gripping by the user. Whilst using a thumb to grip the handle, an index finger of the user can be locatable within a groove whereas the three remaining fingers of the user can be locatable within an arcuate recess located immediately below the groove.

The forward region at the upper end of the lever can have a recess or pocket for engaging and moving a component of the shaft drive mechanism when pivoting the lever to the working position.

The rearward region at the upper end of the lever can have a projection for engaging and moving a component of the shaft release mechanism when pivoting the lever from the resting position in a forward direction, away from the working position.

The hand tool can comprise a lever assembly that includes the hand-operable lever. The lever assembly can comprise a mounting pin and the upper end of the lever can be pivotally connected to the body by way of the mounting pin.

The hand-operable lever assembly can comprise a spring or other type of biasing member for pivoting the lever from the working position to the resting position. Preferably, one end of the spring is mounted to the body and another end of the spring engages the rearward region of the lever.

The shaft can be of any suitable size, shape and construction, and can be made of any suitable material or materials. The shaft can be tubular or a solid rod, and is preferably made of metal. The surface of the shaft can be rough, so as to provide a grippable surface. The shaft can comprise two or more detachable shaft pieces.

The hand tool can comprise a shaft assembly that includes the shaft. The shaft assembly can comprise one or more components, such as retaining/clamping nuts, bushes or bearings, for mounting one or more load applying members of the tool to the shaft and for mounting the shaft to the body. The shaft itself can be internally and or externally threaded. The shaft or regions thereof can be other than of circular cross section so as to prevent any load applying members from rotating through 360 degrees relative to the body or for fixedly mounting a load applying member to the shaft.

The shaft assembly can comprise a handle mounted to the shaft to help the user pull the shaft in the reverse direction. The handle can also serve as a travel stop (by colliding with the body), to determine how far a load applying member may move relative to the body.

The shaft drive mechanism can be of any suitable size, shape and construction, and can be made of any suitable material or materials. The shaft drive mechanism can be mounted to the body in any suitable way. The shaft drive mechanism can be operatively connected to the shaft and lever in any suitable way.

In one embodiment the shaft drive mechanism comprises a shaft drive member having an upper region having an aperture through which extends the shaft and a lower region that engages the upper end of the lever. The drive member can be moved by the upper end of the lever from a shaft-release position to a shaft-engaging position. Whilst pivoting the lever to the working position, the lower end of the drive member can be moved in a forward direction by the lever to the shaft-engaging position, at which time the drive member can tilt and grip the shaft and also move the shaft in the forward direction. Preferably, the drive member is in the form of an oblong plate or bar being of sufficient width so as to adequately grip/bite the shaft.

The shaft drive mechanism can also comprise a biasing member, such as spring, for returning the drive member to the shaft-release position whilst the lever pivots back to the resting position. Any suitable type of spring can be used. Preferably, a coil spring extends between the drive member and a wall of the body or other fixed component of the tool.

The shaft release mechanism can allow for disengagement of the load applying members from the first and second surfaces when the shaft is moved in the reverse direction, even if the tool is under heavy load.

The shaft release mechanism can be of any suitable size, shape and construction, and can be made of any suitable material or materials. The shaft release mechanism can be mounted to the body in any suitable way. The shaft release mechanism can be located within the body or externally of the body. Preferably, the shaft release mechanism is located within the body.

The shaft release mechanism can comprise:

a shaft locking member comprising an upper region having an aperture through which extends the shaft, a lower region that engages an upper end of the lever, and a mid-region, wherein the shaft locking member is movable by the lever between a locking position and an unlocking position;

a pivot point mounted to the body which engages the mid-region and about which the locking member can rock or pivot to correctly orientate the shaft relative to the aperture of the shaft locking member; and a biasing member for returning the shaft locking member to the locking position.

The shaft locking member can be moved between the locking position and the unlocking position by the lever, whereby the mid-region rocks/pivots on the pivot point to correctly orientate the shaft relative to the aperture of the shaft locking member. When wishing to release the shaft, the lower end of the shaft locking member can be moved in a rearward direction by the lever to the unlocking position, at which time the mid-region rocks/pivots about the pivot point, and the shaft locking member releases the shaft, thereby allowing the shaft to be freely moved by hand through the shaft locking member aperture in the reverse direction. Preferably, the locking member is in the form of an oblong plate or bar being of sufficient width so as to adequately grip/bite the shaft. A region of the shaft extending through the locking member can be other than circular so as to provide a better gripping surface.

The biasing member can be a spring and any suitable type of spring can be used. Preferably, a coil spring extends between the shaft locking member and a wall of the body or other fixed component of the tool.

In a second aspect, the inventor has developed a hand tool for applying loads to first and second spaced apart surfaces, such as compressive forces to caliper pistons or brake pads of a vehicle disc-brake assembly. Although preferred, the tool according to the second aspect need not have the dual mode lever action described above.

According to a second aspect of the present invention, there is provided a load applying hand tool for applying loads to first and second spaced apart surfaces, said tool comprising:

a body;

a handle extending from the body;

a hand-operable lever pivotally connected to the body and pivotable from a resting position towards the handle to a working position;

a shaft extending through the body along a longitundal axis, and movable between forward and reverse directions along the axis relative to the body;

a movable load applying member mounted to the shaft for applying a load to the first surface when moved by the shaft in the forward direction into engagement with the first surface;

a fixed load applying member held relative to the body and not movable by the shaft, for applying a load to the second surface when brought into engagement with the second surface;

a shaft drive mechanism mounted to the body and operatively connected to the shaft and lever such that pivoting of the lever to the working position causes the shaft drive mechanism to incrementally advance the shaft only in the forward direction; and a shaft release mechanism mounted to the body that when manually actuated allows the shaft to be moved in the reverse direction so as to allow disengagement of the load applying members from the first and second surfaces The first and second spaced apart surfaces can be any suitable types of surfaces that require the application of a directional force. Preferably, the first and second surfaces are brake pads, caliper pistons or a caliper casting of a vehicle disc-brake assembly, and the tool provides compression of single, twin or quad caliper pistons such that worn brake pads can be removed and or replaced.

The body of the tool can be of any suitable size, shape and construction, and can be made of any suitable material or materials, such as molded plastics material. The body can comprise a frame and or have external and internal walls that provide a housing for components such as part of the lever, part of the shaft, the shaft drive mechanism, and the shaft release mechanism. The housing can be in two or more detachable pieces so as to allow ready access to components located within.

The handle can be of any suitable size, shape and construction, and can be made of any suitable material or materials, such as molded plastics material. The handle and body can be of unitary construction. Preferably, the handle is in the form of a pistol grip handle extending from a lower region of the body and generally within the same plane as the body.

The handle can have a forward region and a rearward region. The forward region can have a longitudinally extending slot for receiving a rearward region of the lever when in the working position.

An external surface of the handle can have a grip so as to provide a user of the tool with additional traction. In one embodiment, the grip is in the form of ribbing molded within a surface of the handle.

The hand operable lever can be of any suitable size, shape and construction, and can be made of any suitable material or materials. The lever can have an upper end and a lower end. The lever can have a forward region and a rearward region. The lever can be made of molded plastics material.

The forward region at the lower end of the lever can be shaped for easy gripping by the user. Whilst using a thumb to grip the handle, an index finger of the user can be locatable within a groove whereas the three remaining fingers of the user can be locatable within an arcuate recess located immediately below the groove.

The forward region at the upper end of the lever can have a recess or pocket for engaging and moving a component of the shaft drive mechanism when pivoting the lever to the working position.

The rearward region at the upper end of the lever can have a projection for engaging and moving a component of the shaft release mechanism when pivoting the lever from the resting position in a forward direction, away from the working position.

The hand tool can comprise a lever assembly that includes the hand-operable lever. The lever assembly can comprise a mounting pin and the upper end of the lever can be pivotally connected to the body by way of the mounting pin.

The hand operable lever assembly can comprise a spring or other type of biasing member for pivoting the lever from the working position to the resting position. Preferably, one end of the spring is mounted to the body and another end of the spring engages the rearward region of the lever.

The shaft can be of any suitable size, shape and construction, and can be made of any suitable material or materials. The shaft can be tubular or a solid rod, and is preferably made of metal. The surface of the shaft can be rough, so as to provide a grippable surface. The shaft can comprise two or more detachable shaft pieces.

The hand tool can comprise a shaft assembly that includes the shaft. The shaft assembly can comprise one or more components, such as retaining/clamping nuts, bushes or bearings, for mounting the fixed and movable load applying members to the shaft and for mounting the shaft to the body. The shaft itself can be internally and or externally threaded. The shaft or regions thereof can be other than of circular cross section so as to prevent any load applying members from rotating through 360 degrees relative to the body or for fixedly mounting a load applying member to the shaft.

The shaft assembly can comprise a handle mounted to the shaft to help the user pull the shaft in the reverse direction. The handle can also serve as a travel stop (by colliding with the body), to determine how far the load applying member may move relative to the body.

The shaft drive mechanism can be of any suitable size, shape and construction, and can be made of any suitable material or materials. The shaft drive mechanism can be mounted to the body in any suitable way. The shaft drive mechanism can be operatively connected to the shaft and lever in any suitable way.

In one embodiment the shaft drive mechanism comprises a shaft drive member having an upper region having an aperture through which extends the shaft and a lower region that engages the upper end of the lever. The drive member can be moved by the upper end of the lever from a shaft-release position to a shaft-engaging position. Whilst pivoting the lever to the working position, the lower end of the drive member can be moved in a forward direction by the lever to the shaft-engaging position, at which time the drive member can tilt and grip the shaft and also move the shaft in the forward direction. Preferably, the drive member is in the form of an oblong plate or bar being of sufficient width so as to adequately grip the shaft.

The shaft drive mechanism can also comprise a biasing member, such as spring, for returning the drive member to the shaft-release position whilst the lever pivots back to the resting position. Any suitable type of spring can be used. Preferably, a coil spring extends between the drive member and a wall of the body or other fixed component of the tool.

The shaft release mechanism can be of any suitable size, shape and construction, and can be made of any suitable material or materials. The shaft release mechanism can be mounted to the body in any suitable way. The shaft release mechanism can be located within the body or externally of the body. If located externally of the body, the shaft release mechanism can be essentially as described in the specifications of U.S. Pat. No. 6,874,217 and U.S. Pat. No. 7,076,850.

Preferably, the shaft release mechanism is located within the body and is released by the lever when the lever is moved in the forward direction from the resting position, away from the working position.

The shaft release mechanism can comprise:

a shaft locking member comprising an upper region having an aperture through which extends the shaft, a lower region that engages an upper end of the lever, and a mid-region, wherein the shaft locking member is movable by the lever between a locking position and an unlocking position;

a pivot point connected to the body which engages the mid-region and about which the locking member can rock or pivot to correctly orientate the shaft relative to the aperture of the shaft locking member; and a biasing member for returning the shaft locking member to the locking position.

The shaft locking member can be moved between a locking position and an unlocking position by the lever, whereby the mid-region rocks or pivots on the pivot point to correctly orientate the shaft relative to the aperture of the shaft locking member. When wishing to release the shaft, the lower end of the shaft locking member can be moved in a rearward direction by the lever to the unlocking position, at which time the mid-region rocks/pivots about the pivot point, and the shaft locking member releases the shaft, thereby allowing the shaft to be freely moved by hand through the shaft locking member aperture in the reverse direction. Preferably, the locking member is in the form of an oblong plate or bar being of sufficient width so as to adequately grip the shaft. A region of the shaft extending through the locking member can be other than circular so as to provide a better gripping surface.

The biasing member can be a spring and suitable type of spring can be used. Preferably, a coil spring extends between the shaft locking member and a wall of the body or other fixed component of the tool.

The movable load applying member can be of any suitable size, shape and construction, and can be made of any suitable material or materials. The movable load applying member can be mounted to the shaft in any suitable way. Preferably, the movable load applying member is mounted to a forward end of the shaft and is rotatable relative to the longitudinal axis through an angle of about 180°.

Preferably, the movable load applying member is in the form of a T-shaped plate with a stem of the T mounted to the shaft.

The fixed load applying member can be of any suitable size, shape and construction, and can be made of any suitable material or materials. The fixed load applying member can be held relative to the shaft in any suitable way. Preferably, the fixed load applying member is rotatable relative to the longitudinal axis through an angle of about 180°.

Preferably, the fixed load applying member is in the form of a T-shaped plate with a stem of the T mounted to the shaft.

Preferably, the movable and fixed load applying members comprise plates extending in spaced parallel planes, and are rotatable relative to the longitudinal axis along a common arc of about 180 degrees.

In a third aspect, the inventor has developed a compression hand tool for compressing pistons or brake pads of different types of caliper units.

According to a third aspect of the present invention, there is provided a hand tool for compressing first and second spaced apart surfaces of a caliper unit of a vehicle brake assembly, said tool comprising:

a body;

a handle extending from the body;

a hand-operable lever pivotally connected to the body and pivotable from a resting position towards the handle to a working position;

a shaft extending through the body along a longitundal axis, and movable between forward and reverse directions along the axis relative to the body;

a movable load applying plate mounted to the shaft for applying a compressive force to the first surface when moved by the shaft in the forward direction into engagement with the first surface, wherein the movable load applying plate is mounted to a forward end of the shaft and is manually rotatable relative to the longitudinal axis through an angle of about 180°;

a fixed load applying plate held relative to the body and not movable by the shaft, for applying a compressive force to the second surface when brought into engagement with the second surface, wherein the fixed load applying plate is manually rotatable relative to the longitudinal axis through an angle of about 180°;

a shaft drive mechanism mounted to the body and operatively connected to the shaft and lever such that pivoting of the lever to the working position causes the shaft drive mechanism to incrementally advance the shaft only in the forward direction; and a shaft release mechanism mounted to the body and operatively connected to the shaft and lever such that movement of the lever from the resting position away from the working position enables the shaft to be moved in the reverse direction.

A caliper casting, brake pad(s), brake pad mount(s) and or piston(s) of a caliper unit can provide the first and second surfaces, and will depend on the type of vehicle disc-brake assembly and the task at hand.

The components of the hand tool according to the third aspect can be as described in respect of the first and second aspects.

A preferred embodiment of the invention will now be described, by way of example, with reference to the accompanying drawings. The preferred embodiment exemplifies all three aspects of the invention described above.

BRIEF DESCRIPTION OF THE FIGURES

FIG. 1 is a side elevation view of a hand tool for compressing one or more caliper pistons of a vehicle disc-brake assembly, according to an embodiment of the present invention;

FIG. 2 is a cut away view of the hand tool shown in FIG. 1;

FIG. 5 is a side elevation of the hand tool shown in FIG. 3 after having pivoted the hand operable lever forwardly from the resting position (shown in a second mode of use);

FIG. 6 is a cut away view of the hand tool shown in FIG. 5;

FIG. 7 is a front elevation view of the hand tool shown in FIG. 1;

FIG. 8 is a top plan view of the hand tool shown in FIG. 1;

FIG. 9 is a rear elevation view of the hand tool shown FIG. 1;

FIG. 10 is a cut away view of the hand tool shown in FIG. 9 and showing load applying members of the tool in the 12 o'clock position;

FIG. 11 is the same as FIG. 10 but showing the load applying members in a different position;

FIG. 12 is the same as FIG. 10 but showing the load applying members in a different position yet again;

DESCRIPTION OF THE PREFERRED EMBODIMENT

Figure 4:
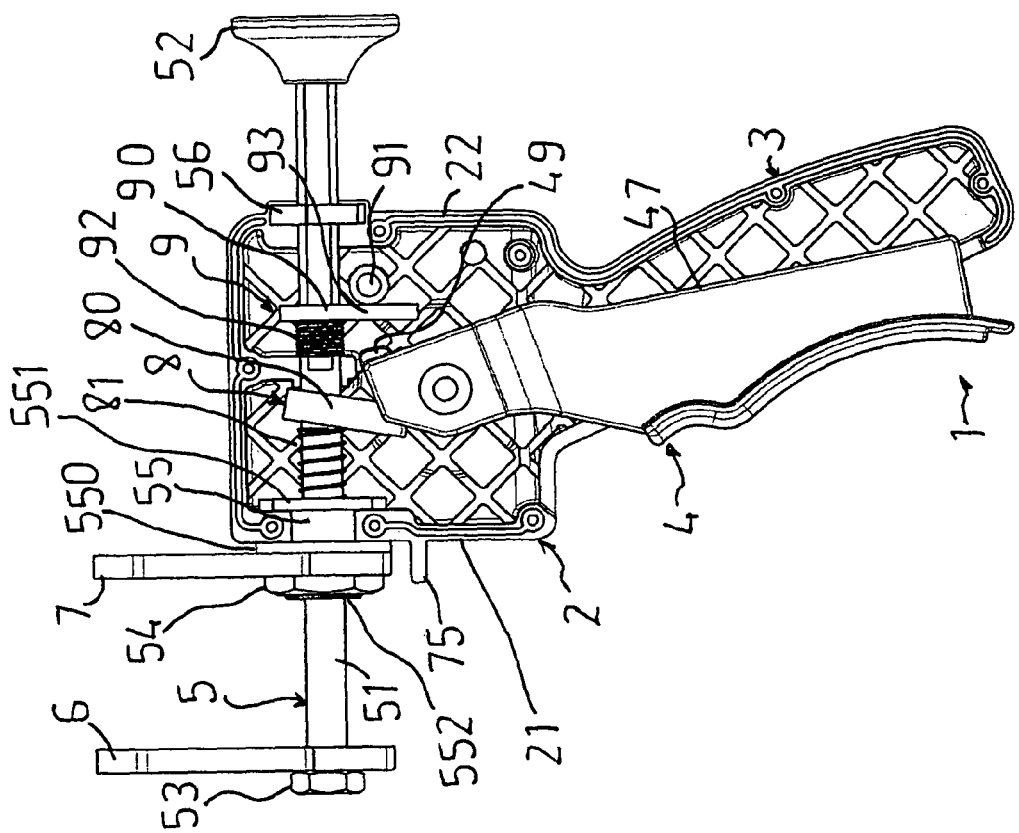
FIG. 4 is a cut away view of the hand tool shown in FIG. 3.

In the figures, like reference numerals refer to like features.

FIGS. 1-15 show a hand tool 1 for applying loads to first and second spaced apart surfaces, such as surfaces of a caliper unit of a vehicle disc-brake assembly. The tool 1 includes a body 2, a handle 3 extending from the body 2, a lever assembly 4, a shaft assembly 5, a movable load applying member 6, a fixed load applying member 7, a shaft drive mechanism 8 and a shaft release mechanism 9.

The body 2 has walls that provide a housing for various components of the tool. The housing 2 is in two detachable pieces (connected together with screws—not labelled) so as to allow ready access to components located within. As seen in FIGS. 1 and 2, the body 2 has a front wall 21, a rear wall 22, a pair of side walls 23 and a top wall 24. The body 2 is made of molded plastics material.

The handle 3 and body 2 are of unitary construction. The handle 3 is in the form of a pistol grip handle 3 extending from a lower region of the body 2 and generally within the same plane as the body 2. As seen in FIGS. 1 and 2, the handle 3 has a forward region 31 and a rearward region 32. The forward region 31 has a longitudinally extending slot 33, best viewed in FIG. 13. An external surface of the handle 3 has a grip in the form of spaced ribs.

As seen in FIG. 2, the lever assembly 4 includes a hand-operable lever 41, a lever mounting pin 42 and a lever return spring 43.

The lever 41 has an upper end 44, a lower end 45, a forward region 46 and a rearward region 47. The lever 4 is made of molded plastics material.

The forward region 46 at the upper end 44 of the lever 4 has a recess 48 (shown in phantom in FIG. 2). The rearward region 47 at the upper end 44 of the lever 4 has a rearwardly extending projection 49. The forward region 46 at the lower end 45 of the lever 4 is shaped for easy gripping by the user. An index finger of the user is locatable within a groove 140 whereas the three other fingers of the user are locatable within an arcuate recess 141 located immediately below the groove 140.

Figure 3:
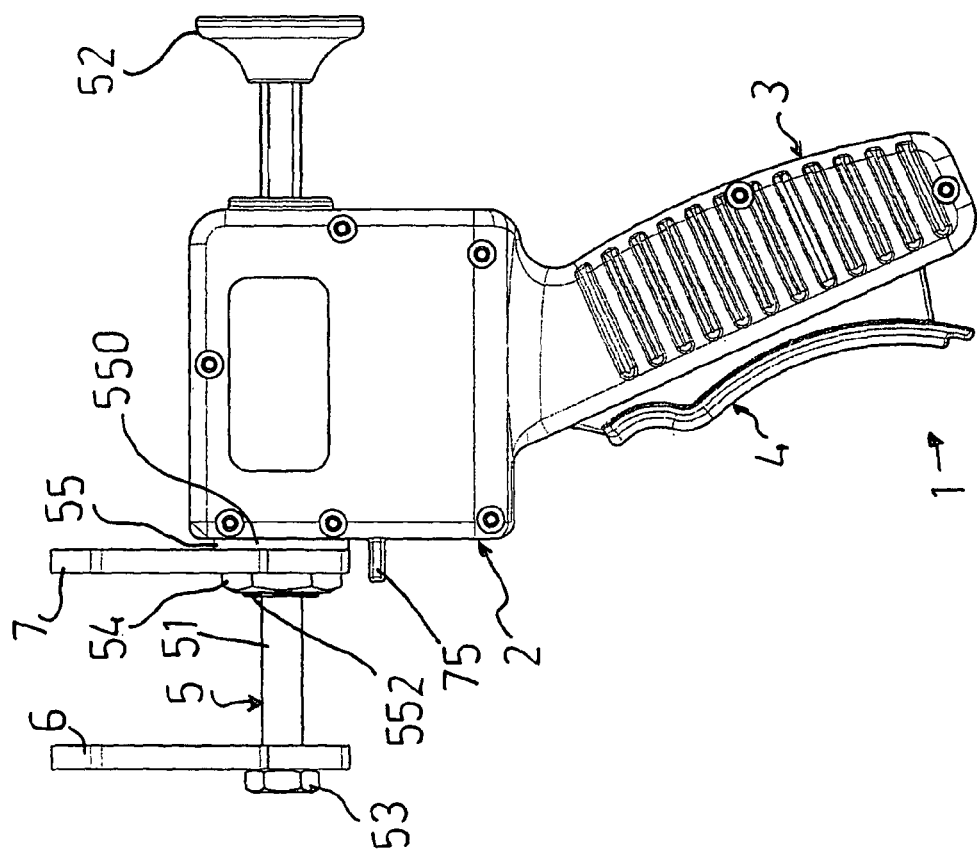
FIG. 3 is a side elevation of the hand tool shown in FIG. 1 after having pivoted a hand-operable lever from a resting position to a working position (shown in a first mode of use)
Figure 13:
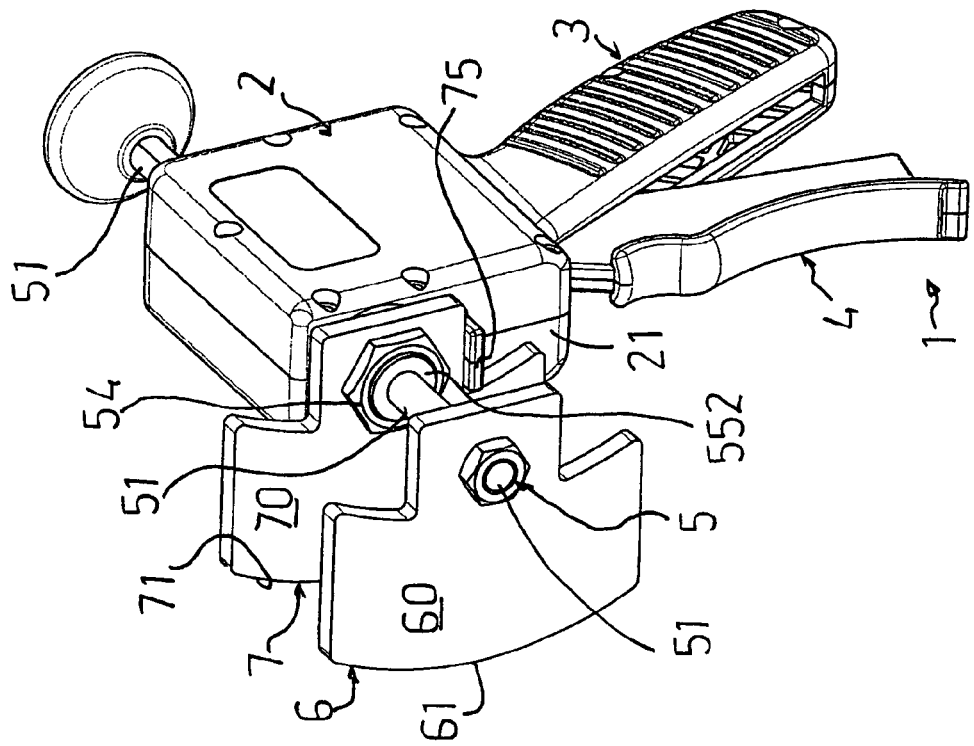
FIG. 13 is a front perspective view of the hand tool as shown in FIG. 10.

In one mode of action, the lever 4 is pivotable by hand from a resting position as shown in FIG. 1 to a working position as seen in FIG. 3. Pivoting occurs in the general plane of the body 2 and the handle 3. In the working position the rearward region 47 of the lever 4 is located within the slot 33 of the handle 3, as seen in FIGS. 3 and 4.

The lever return spring 43 ensures automatic return of the lever 4 from the working position to the resting position. One end of the spring 43 is pinned to the body 2 and another end of the spring 43 engages the rearward region 47 of the lever 4.

In another mode of action, the lever 4 is pivotable by hand in a forward direction from the resting position—that is, away from the working position. The direction of lever 4 travel is shown in FIGS. 5 and 6.

As best viewed in FIGS. 3 and 4, the shaft assembly 5 includes a metal shaft 51, a handle 52 as well as locking/clamping nuts 53, 54 and bearings 55, 56 for mounting the movable 6 and fixed 7 load applying members to the shaft 51 and for mounting the shaft 51 to the body 2.

Figure 15:
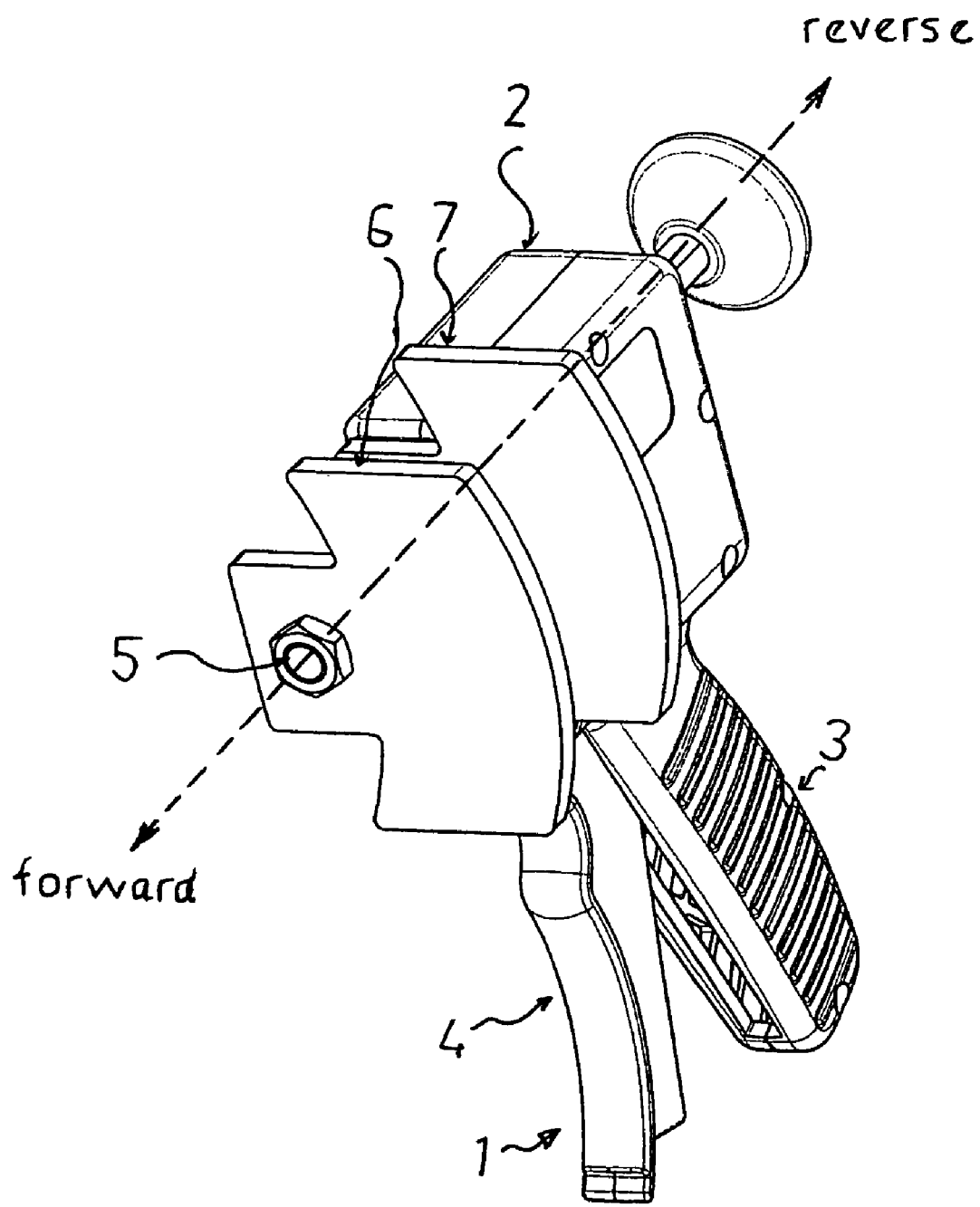
FIG. 15 is a front perspective view of the hand tool as shown in FIG. 12.
Figure 16:
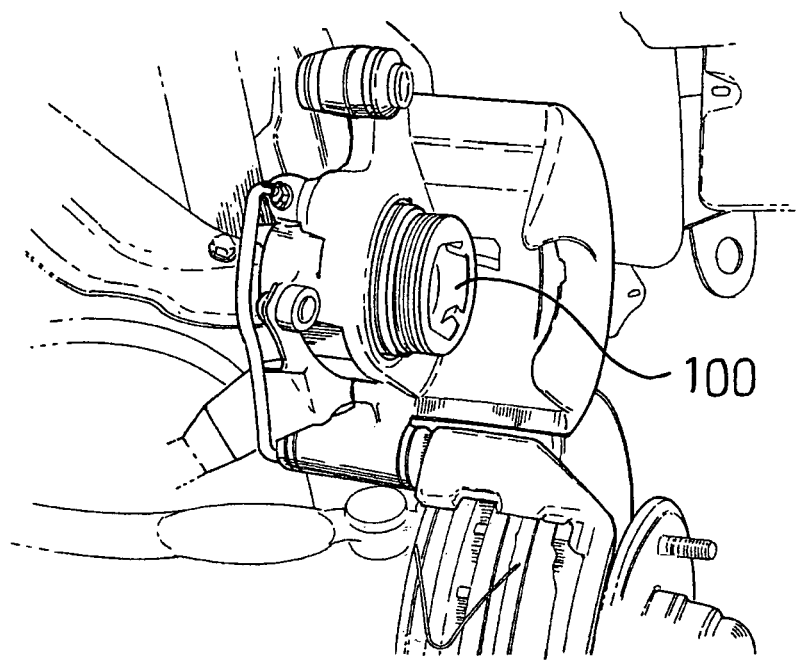
FIG. 16 shows a single piston floating caliper of a vehicle disc-brake assembly.
Figure 17:
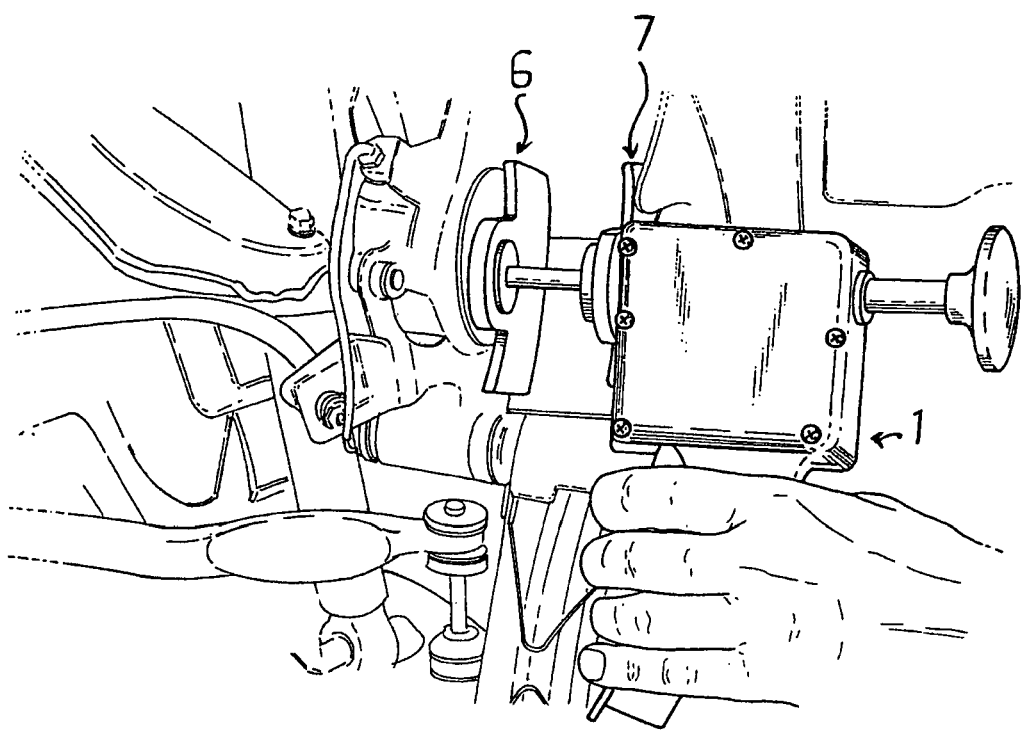
FIG. 17 shows how the hand tool as configured in FIG. 14 can be used to compress the caliper piston of the assembly shown in FIG. 16.
Figure 19:
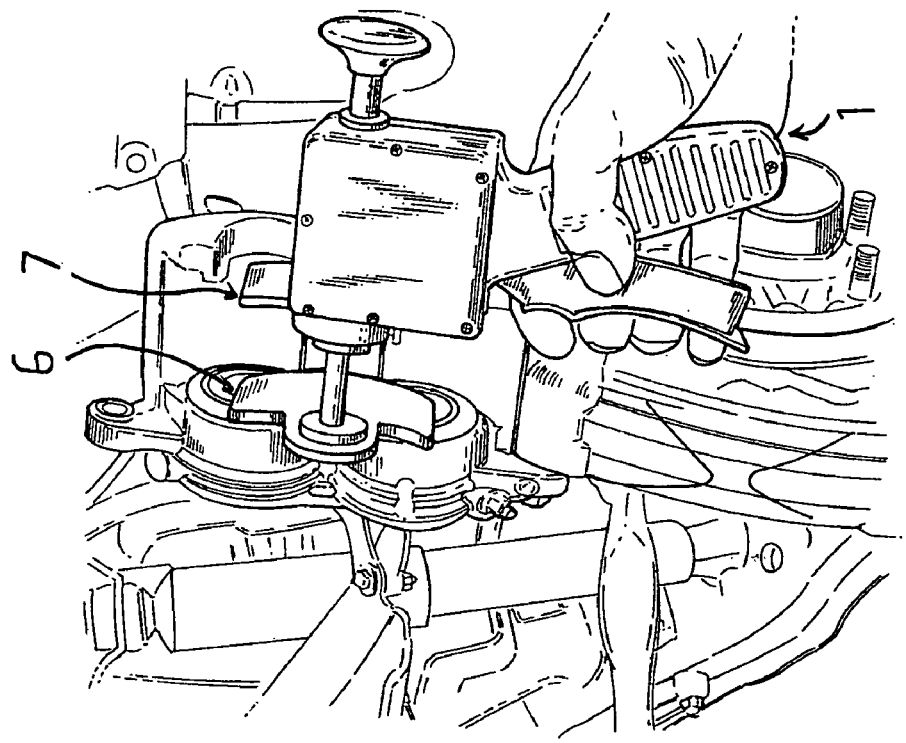
FIG. 19 shows how the hand tool as configured in FIG. 14 can be used to compress the dual caliper pistons of the assembly shown in FIG. 18.
Figure 18:
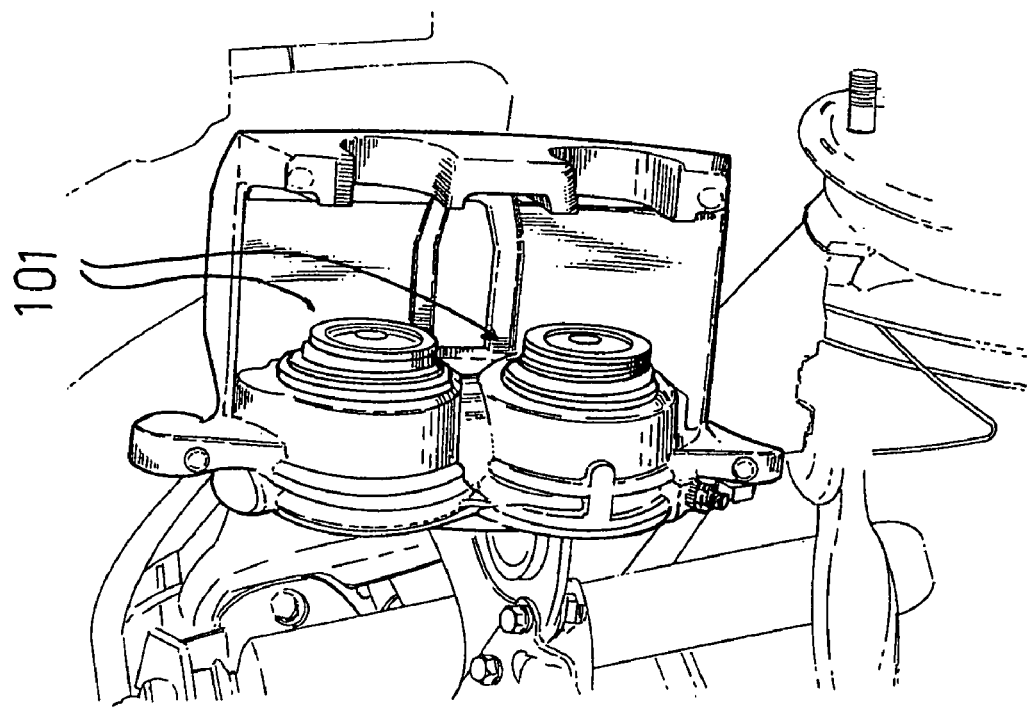
FIG. 18 shows a dual piston floating caliper of a vehicle disc-brake assembly.
Figure 20:
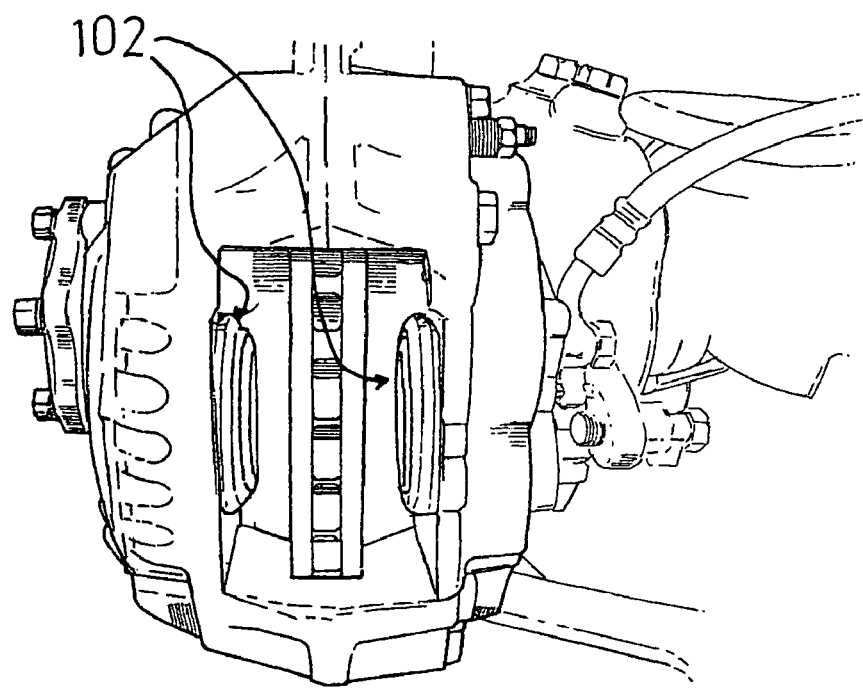
FIG. 20 shows a dual piston fixed caliper of a vehicle disc-brake assembly.
Figure 21:
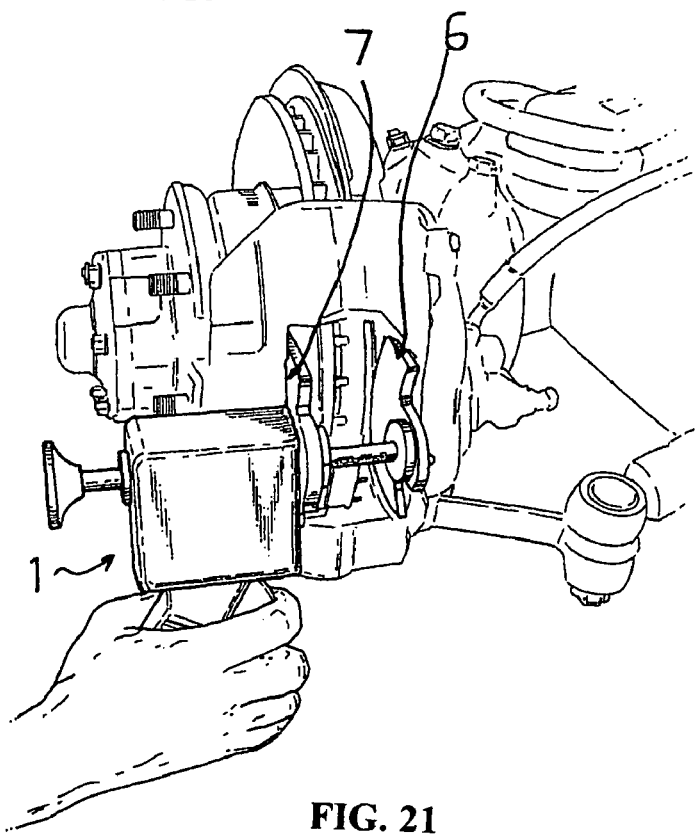
FIG. 21 shows how the hand tool as configured in FIG. 15 can be used to compress the dual caliper pistons of the assembly shown in FIG. 20.
Figure 22:
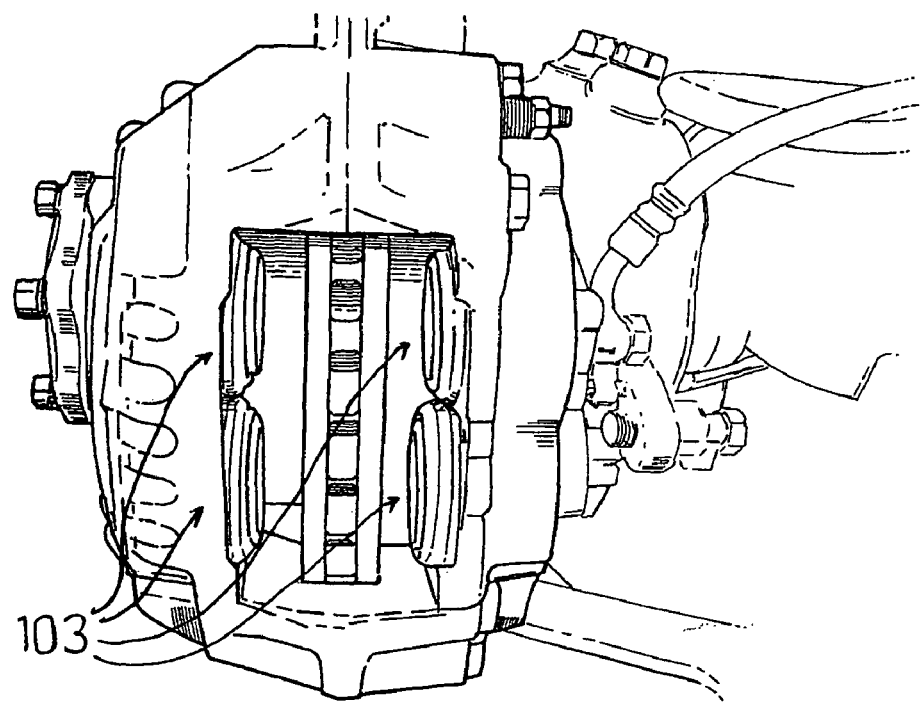
FIG. 22 shows a quad piston fixed caliper of a vehicle disc-brake assembly.
Figure 23:
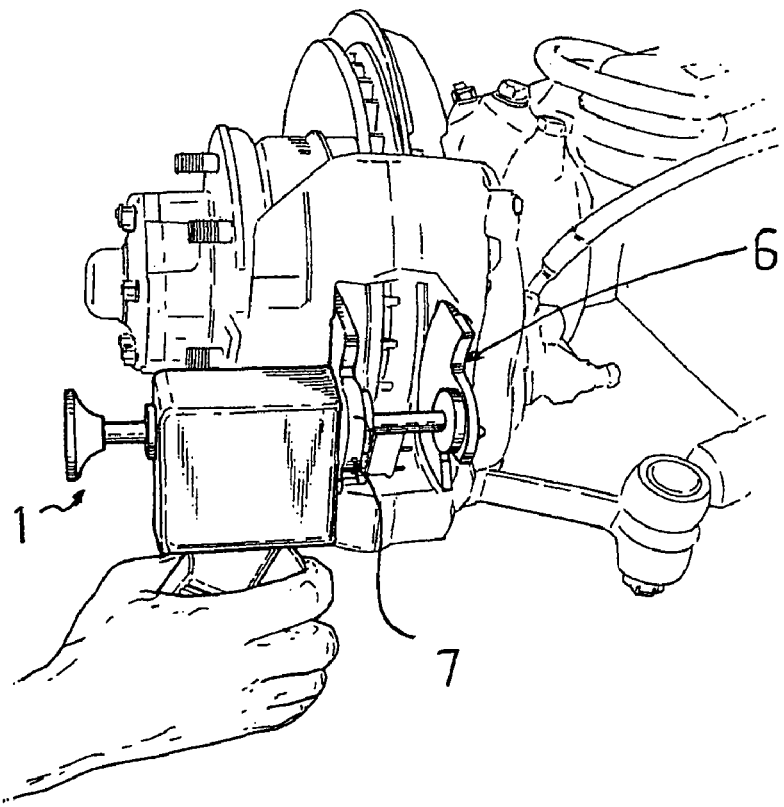
FIG. 23 shows how the hand tool as configured in FIG. 15 can be used to compress the quad caliper pistons of the assembly shown in FIG. 22.

The shaft 51 extends through the body 2 along a longitudinal axis, and is movable between forward and reverse directions along the axis relative to the body 2, as shown in FIG. 15. The shaft 51 has a forward end having an external thread and a rearward end having an internal thread. The shaft 51 has regions that are of circular cross section and of generally D-shaped cross section.

Referring now to FIGS. 3 and 4, a bearing 55 having flanges 550, 551 and a sleeve 552 is partly located within an opening in the front wall 21 of the body 2. The region of the shaft 51 extending through the bearing 55 is of circular cross section. The flange 551 is shaped so as to prevent rotation of the sleeve 552 within the front wall 21 opening. The sleeve 552 has an external thread and extends forwardly along the shaft 51. A clamping nut 54 is screwed to an end of the sleeve 552.

Referring now to FIGS. 10-12, a bearing 56 having a generally D-shaped aperture 560 and having a generally circular but stepped outer periphery 561 is located within a diskoid opening in the rear wall 22 of the body 2. The region of the shaft 51 extending through the bearing 56 has a generally D-shaped cross section such that the bearing 56 must rotate with the shaft 51. The diskoid opening allows the bearing 56 to rotate therein about the longitudinal axis, but only through an angle of about 180 degrees. A travel stop 562 located in the diskoid opening at about the 3 o'clock position (when the tool 1 is viewed from the rear) prevents the bearing 56 from rotating through an angle of 360 degrees, but allows uninhibited rotation of the bearing 56 and shaft 51 between the 9 and 3 o'clock positions via the 12 o'clock position.

The movable load applying member 6 can apply a load to the first surface when moved by the shaft 51 in a forward direction into engagement with the first surface. Likewise, the fixed load applying member 7 can apply a load to the second surface when brought into engagement with the second surface.

Figure 14:
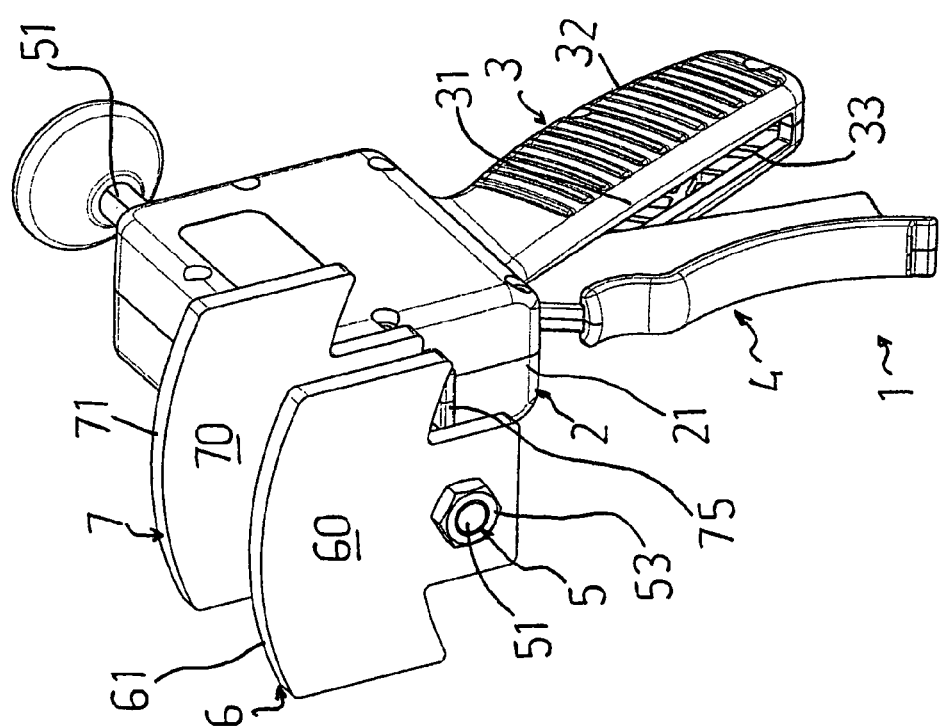
FIG. 14 is a front perspective view of the hand tool as shown in FIG. 11.

As seen in FIG. 14, the movable load applying member 6 is in the form of a T-shaped metal plate 60 with a stem of the T having a D-shaped aperture through which extends a short D-shaped ("notched") region of the shaft 51. A top edge of the plate 61 is arcuate because most caliper castings are also arcuate in shape. The forward end of the shaft 51 has an external thread to which is screwed a clamping nut 53. The clamping nut 53 and D-shaped notched region of the shaft 51 ensure that the T-shaped plate 60 is fixedly mounted to the forward end of the shaft 51 and is rotatable with the shaft 51 through an angle of about 180°, as allowed by the bearing 56 located in the rear wall 22 of the body 2.

As also seen in FIG. 14, the fixed load applying member 7 is mounted adjacent the front wall 21 of the body 2. The fixed load applying member 7 is in the form of a metal T-shaped plate 70 with a stem of the T having a round aperture through which the shaft 51 extends. The plate 70 is clamped between the clamping nut 54 and the flange 550 of the bearing 55. The member 7 is rotatable about the sleeve 552 of the bearing 55. A top edge 71 of the plate 70 is arcuate as most caliper castings are also arcuate in shape.

A travel stop lug 75 extending from the front wall 21 of the body 2 at about the 6 o'clock position relative to the longitudinal axis prevents the member 7 from rotating through an angle of 360 degrees, but allows uninhibited rotation of the member 7 between the 9 and 3 o'clock positions via the 12 o'clock position.

As seen in FIGS. 10-15, the movable 6 and fixed load 7 applying members extend in spaced parallel planes, and are rotatable relative to the body 2 along a common arc of about 180 degrees between the 9 and 3 o'clock positions via the 12 o'clock position. Although the plates 60, 70 are shown as extending in exactly the same direction relative to the longitudinal axis, they can in fact be rotated/configured independently as required.

The shaft drive mechanism 8 is mounted to the body 2 and operatively connected to the shaft 51 and lever 4 such that pivoting of the lever 4 to the working position causes the shaft drive mechanism 8 to incrementally advance the shaft 51 only in the forward direction.

Referring now to FIGS. 2, 4 and 6, the shaft drive mechanism 8 comprises a shaft drive bar 80 and a coil spring 81. The shaft drive bar 80 has an upper region having an aperture through which extends a D-shaped region of the shaft 51 and a lower region that engages the recess 48 of the upper end 44 of the lever 4. The shaft drive bar 80 can be moved by the lever 4 from a shaft-engaging position (FIG. 4) to a shaft-release position (FIG. 2). Whilst pivoting the lever 4 to the working position, the lower end of the shaft drive bar 80 is moved in a forward direction by the lever 4 to the shaft-engaging position, at which time the shaft drive bar 80 tilts and grips/bites the shaft 51 and also moves the shaft 51 in the forward direction.

The coil spring 81 extends between the shaft drive bar 80 and the flange 551 of the bearing 55. The spring 81 returns the shaft drive bar 80 to the shaft-release position whilst the lever 4 pivots back to the resting position.

The shaft release mechanism 9 is mounted to the body 2 and is operatively connected to the shaft 51 and lever 4 such that movement of the lever 4 from the resting position (FIG. 2) away from the working position (FIG. 6) enables the shaft 51 to be manually retracted/moved along the longitudinal axis in the reverse direction.

The shaft release mechanism 9 includes a shaft locking plate 90, a pivot point/sleeve 91 and a coil spring 92. Referring now to FIGS. 2 and 4, the locking plate 90 has an upper region having an aperture through which extends a D-shaped cross section of the shaft 51, a lower region that engages the projection 49 of the lever 4, and a mid-region 93.

The pivot point 91/sleeve 91 extends between the side walls 23 of the body 2. The sleeve 91 engages the mid-region 93 and causes the locking plate 90 to rock over/pivot about a contact surface of the sleeve 91.

The locking plate 90 can be moved from a locking position (FIG. 4) to an unlocking position (FIG. 6) by the lever 4, whereby the mid-region 93 rocks to correctly orientate the shaft 51 relative to the aperture of the locking plate 90. When wishing to release the shaft 51 (when under load), the lower end of the locking plate 90 is moved in a rearward direction by the projection 49 of the lever 4 to the unlocking position, at which time the mid-region 93 rocks, and the locking plate 90 releases the shaft 51, thereby allowing the shaft 51 to be freely moved by hand through the locking plate 90 aperture in the reverse direction.

The coil spring 92 extends between the locking plate 90 and an internal wall 95 of the body 2. The spring 92 ensures that the locking plate 90 can always return to the locking position (FIG. 4).

The handle 52 is mounted with a screw to an internal thread of the shaft 51 and helps a user of the tool 1 pull the shaft 51 in the reverse direction. The handle 51 also serves as a travel stop (by colliding with the body 2). It determines how far the movable load applying member 6 can be moved relative to the body 2.

The first and second spaced apart surfaces can be any suitable types of surfaces that require the application of a load (directional force). As seen in FIGS. 16 to 23, the tool 1 is preferrably a brake pad or caliper piston compression tool 1, whereby a caliper casting and one or more caliper pistons provide the first and second surfaces.

In use, the tool 1 is placed adjacent the caliper unit of the brake assembly, the movable 6 and fixed load 7 applying members are rotated about the longitudinal axis into the required position, the members 6, 7 are placed between the first and second surfaces of the caliper unit, and the lever 4 is actuated to advance the shaft 51 and movable member 6 until both members 6, 7 apply loads to the surfaces and each caliper piston fully retracts into its piston housing.

The tool 1 allows the load applying members 6, 7 to be positioned on the left or right sides of the body 2, or any position there between. This feature allows the user to adjust the tool 1 in such a way that provides the most ergonomic configuration, thus minimizing user fatigue.

As seen from the figures, the tool 1 can provide compression of a single piston floating caliper 100 (FIGS. 16 and 17), a dual piston floating caliper 101 (FIGS. 18 and 19), a dual piston fixed caliper 102 (FIGS. 20 and 21) and a quad piston fixed caliper 103 (FIGS. 22 and 23) such that the brake pads can be replaced.

After full caliper piston retraction, the lever 4 is pivoted forwards as shown in FIG. 6 to actuate the shaft release mechanism 9 and to enable the shaft 51 to be retracted/moved along the longitudinal axis in the reverse direction (FIG. 15), so as to allow disengagement of the members 6, 7 from the surfaces and complete removal of the tool 1.

Due to the mechanical advantage provided by the length of the lever 4, the shaft release mechanism 9 can be easily actuated even if the tool 1 is under heavy load.

Some of the advantages of the hand tool 1 as exemplified are summarised below:

The one tool can be used for many different types of brake assemblies.

The tool prevents damage to pistons, hubs and calipers.

The tool ensures parallel piston retraction on dual and quad piston calipers.

The tool allows for left and right side use.

The tool generates over 1600 ft lbs of force to retract rusted or corroded caliper pistons.

The tool's dual-mode lever mechanism for apply and releasing a load force enables the user to carry out the desired task more easily and in a shorter period of time.

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

The term "comprise" and variants of the term such as "comprises" or "comprising" are used herein to denote the inclusion of a stated integer or stated integers but not to exclude any other integer or any other integers, unless in the context or usage an exclusive interpretation of the term is required.

The invention claimed is:

1. A hand tool comprising:
a body;
a handle extending from the body;
a hand-operable lever pivotally connected to the body and pivotable from a resting position towards the handle to a working position;
a shaft extending through the body along a longitudnal axis, and movable between forward and reverse directions along the axis relative to the body;
a shaft drive mechanism mounted relative to the body and operatively connected to the shaft and lever such that pivoting of the lever to the working position causes the shaft drive mechanism to incrementally advance the shaft only in the forward direction; and
a shaft release mechanism mounted relative to the body and comprising a shaft locking member operatively connected to the shaft and lever, wherein the shaft locking member is movable by the lever between a locking position and an unlocking position, and wherein movement of the lever from the resting position away from the working position moves the shaft locking member to the unlocking position and enables the shaft to be moved in the reverse direction.

2. The hand tool of claim 1, wherein the shaft release mechanism comprises:
the shaft locking member, said shaft locking member comprising an upper region having an aperture through which extends the shaft, a lower region that engages an upper end of the lever, and a mid-region;
a pivot point connected to the body which engages the mid-region and about which the shaft locking member can rock or pivot to correctly orientate the shaft relative to the aperture of the shaft locking member; and
a biasing member for returning the shaft locking member to the locking position.

3. A load applying hand tool for applying loads to first and second spaced apart surfaces of both floating and fixed caliper units, said tool comprising:
a body;
a handle extending from the body;
a hand-operable lever pivotally connected to the body and pivotable from a resting position towards the handle to a working position;
a shaft extending through the body along a longitudnal axis, and movable between forward and reverse directions along the axis relative to the body;
a movable load applying member mounted to the shaft for applying a load to the first surface when moved by the shaft in the forward direction into engagement with the first surface;
a fixed load applying member held relative to the body and not movable by the shaft, for applying a load to the second surface when brought into engagement with the second surface;
a shaft drive mechanism mounted relative to the body and operatively connected to the shaft and lever such that pivoting of the lever to the working position causes the shaft drive mechanism to incrementally advance the shaft only in the forward direction; and
a shaft release mechanism mounted relative to the body that when actuated allows the shaft to be moved in the reverse direction so as to allow disengagement of the load applying plate members from the first and second surfaces,
wherein each said load applying member comprises a compression plate, said compression plates extend in substantially parallel planes with one another, are of substantially the same size and peripheral shape as each other, and are adapted to engage said first and second spaced apart surfaces of both floating and fixed caliper units.

4. The load applying hand tool of claim 3, wherein the movable load applying member is mounted to a forward end of the shaft and is rotatable relative to the longitudinal axis through an angle of about 180°.

5. The load applying hand tool of claim 3, wherein the compression plate of the movable load applying member is in the form of a T-shaped plate with a stem of the T mounted to the shaft.

6. The load applying hand tool of claim 3, wherein the fixed load applying member is rotatable relative to the longitudinal axis through an angle of about 180°.

7. The load applying hand tool of claim 3, wherein the compression plate of the fixed load applying member is in the form of a T-shaped plate with a stem of the T mounted to the shaft.

8. The load applying hand tool of claim 3, wherein the compression plates of the movable and fixed load applying members are rotatable relative to the longitudinal axis along a common arc of about 180 degrees.

9. A hand tool for compressing first and second spaced apart surfaces of a caliper unit of a vehicle disc-brake assembly, said tool comprising:
a body;
a handle extending from the body;
a hand-operable lever pivotally connected to the body and pivotable from a resting position towards the handle to a working position;
a shaft extending through the body along a longitudnal axis, and movable between forward and reverse directions along the axis relative to the body;
a movable load applying plate mounted to the shaft for applying a compressive force to the first surface when moved by the shaft in the forward direction into engagement with the first surface, wherein the movable load applying plate is mounted to a forward end of the shaft and is rotatable relative to the longitudinal axis through an angle of about 180°;
a fixed load applying plate held relative to the body and not movable by the shaft, for applying a compressive force to the second surface when brought into engagement with the second surface, wherein the fixed load applying plate is rotatable relative to the longitudinal axis through an angle of about 180°;
a shaft drive mechanism mounted relative to the body and operatively connected to the shaft and lever such that pivoting of the lever to the working position causes the shaft drive mechanism to incrementally advance the shaft only in the forward direction; and
a shaft release mechanism mounted relative to the body and operatively connected to the shaft and lever such that movement of the lever from the resting position away from the working position enables the shaft to be moved in the reverse direction.

10. A hand tool comprising:

a body;

a handle extending from the body;

a hand-operable lever pivotally connected to the body and pivotable from a resting position towards the handle to a working position;

a shaft extending through the body along a longitundal axis, and movable between forward and reverse directions along the axis relative to the body;

a shaft drive mechanism mounted relative to the body and operatively connected to the shaft and lever such that pivoting of the lever to the working position causes the shaft drive mechanism to incrementally advance the shaft only in the forward direction; and a shaft release mechanism mounted relative to the body and operatively connected to the shaft and lever such that movement of the lever from the resting position away from the working position enables the shaft to be moved in the reverse direction, wherein the shaft release mechanism comprises:

a shaft locking member comprising an upper region having an aperture through which extends the shaft, a lower region that engages an upper end of the lever, and a mid-region, wherein the shaft locking member is movable by the lever between a locking position and an unlocking position;

a pivot point connected to the body which engages the mid-region and about which the locking member can rock or pivot to correctly orientate the shaft relative to the aperture of the shaft locking member; and a biasing member for returning the shaft locking member to the locking position.

11. A load applying hand tool for applying loads to first and second spaced apart surfaces, said tool comprising:

a body;

a handle extending from the body;

a hand-operable lever pivotally connected to the body and pivotable from a resting position towards the handle to a working position;

a shaft extending through the body along a longitundal axis, and movable between forward and reverse directions along the axis relative to the body;

a movable load applying member mounted to the shaft for applying a load to the first surface when moved by the shaft in the forward direction into engagement with the first surface;

a fixed load applying member held relative to the body and not movable by the shaft, for applying a load to the second surface when brought into engagement with the second surface;

a shaft drive mechanism mounted relative to the body and operatively connected to the shaft and lever such that pivoting of the lever to the working position causes the shaft drive mechanism to incrementally advance the shaft only in the forward direction; and a shaft release mechanism mounted relative to the body that when actuated allows the shaft to be moved in the reverse direction so as to allow disengagement of the load applying plate members from the first and second surfaces, wherein the movable load applying member is mounted to a forward end of the shaft and is rotatable relative to the longitudinal axis through an angle of about 180°, and wherein the fixed load applying member is rotatable relative to the longitudinal axis through an angle of about 180°.

12. The load applying hand tool of claim 11, wherein each said load applying member is in the form of a generally T-shaped plate with a stem of the T mounted to the shaft.

* * * * *

UNITED STATES PATENT AND TRADEMARK OFFICE
CERTIFICATE OF CORRECTION

| | | |
|---|---|---|
| PATENT NO. | : 8,276,251 B2 | Page 1 of 1 |
| APPLICATION NO. | : 12/505743 | |
| DATED | : October 2, 2012 | |
| INVENTOR(S) | : Mitchell | |

It is certified that error appears in the above-identified patent and that said Letters Patent is hereby corrected as shown below:

On the Title Page, (item 57, Abstract), line 5 "longitundal" should be —longitudinal—.

In the specification

Column 5, line 4, "longitundal" should be —longitudinal—.

Column 8, line 5, "longitundal" should be —longitudinal—.

Column 10, lines 23-24, "longitundal" should be —longitudinal—.

In the claims

Column 13, line 20, "longitundal" should be —longitudinal—.

Column 13, line 57, "longitundal" should be —longitudinal—.

Column 14, line 45, "longitundal" should be —longitudinal—.

Column 15, line 10, "longitundal" should be —longitudinal—.

Column 16, line 6, "longitundal" should be —longitudinal—.

Signed and Sealed this
Nineteenth Day of July, 2016

Michelle K. Lee
*Director of the United States Patent and Trademark Office*